US012730912B2

(12) United States Patent
Yang et al.

(10) Patent No.: US 12,730,912 B2
(45) Date of Patent: Sep. 8, 2026

(54) DATABASE SERVICE EXECUTION METHODS AND APPARATUSES

(71) Applicant: Beijing Oceanbase Technology Co., Ltd., Beijing (CN)

(72) Inventors: Zhenkun Yang, Hangzhou (CN); Yi Pan, Hangzhou (CN); Guoping Wang, Hangzhou (CN); Boyang Li, Hangzhou (CN)

(73) Assignee: Beijing Oceanbase Technology Co., Ltd., Beijing (CN)

( * ) Notice: Subject to any disclaimer, the term of this patent is extended or adjusted under 35 U.S.C. 154(b) by 98 days.

(21) Appl. No.: 18/871,384

(22) PCT Filed: Aug. 8, 2023

(86) PCT No.: PCT/CN2023/111734
§ 371 (c)(1),
(2) Date: Dec. 3, 2024

(87) PCT Pub. No.: WO2024/078107
PCT Pub. Date: Apr. 18, 2024

(65) Prior Publication Data

US 2025/0348606 A1 Nov. 13, 2025

(30) Foreign Application Priority Data

Oct. 12, 2022 (CN) ........................ 202211248725.3

(51) Int. Cl.
*G06F 21/62* (2013.01)
*G06F 16/215* (2019.01)

(52) U.S. Cl.
CPC ........ *G06F 21/6209* (2013.01); *G06F 16/215* (2019.01)

(58) Field of Classification Search
CPC ............... G06F 21/6209; G06F 16/215; G06F 2221/2143; G06F 16/23; G06F 11/1471
See application file for complete search history.

(56) References Cited

U.S. PATENT DOCUMENTS

2002/0133487 A1 9/2002 Oshins et al.
2003/0198458 A1* 10/2003 Greenwood ............ H04N 5/76 386/294
(Continued)

FOREIGN PATENT DOCUMENTS

CN 109976668 A 7/2019
CN 111191213 A 5/2020
(Continued)

OTHER PUBLICATIONS

"International Search Report" regarding Intl. Application No. PCT/CN2023/111734, mailed on Nov. 22, 2023, pp. 1-11.

*Primary Examiner* — Hany S. Gadalla

(57) ABSTRACT

This specification discloses database service execution methods and apparatuses. An object deletion request can be received, and a to-be-deleted object can be determined. However, the to-be-deleted object is not immediately deleted, but an operation permission for the to-be-deleted object is modified, and a user is prohibited from accessing the to-be-deleted object. When an object restoration request that carries an object identifier is received, a to-be-deleted object corresponding to the object identifier is determined from each to-be-deleted object whose operation permission has been modified; and an operation permission for the to-be-deleted object corresponding to the object identifier is modified, and the user is allowed to access the to-be-deleted object corresponding to the object identifier.

20 Claims, 2 Drawing Sheets

(56) References Cited

U.S. PATENT DOCUMENTS

| | | | | |
|---|---|---|---|---|
| 2013/0018852 | A1 | 1/2013 | Barton et al. | |
| 2019/0095285 | A1* | 3/2019 | McCormack | G06F 11/1451 |
| 2019/0095455 | A1* | 3/2019 | Barreto | G06F 11/1446 |
| 2021/0247906 | A1* | 8/2021 | Sun | G06F 11/1484 |

FOREIGN PATENT DOCUMENTS

| | | | |
|---|---|---|---|
| CN | 113169970 | A | 7/2021 |
| CN | 115309766 | A | 11/2022 |

* cited by examiner

DATABASE SERVICE EXECUTION METHODS AND APPARATUSES

CROSS-RELATED APPLICATIONS

This specification is a national stage entry of international application no. PCT/CN2023/111734, filed Aug. 8, 2023, which claims priority to Chinese Patent Application No. 202211248725.3, filed with the China National Intellectual Property Administration on Oct. 12, 2022, which is incorporated herein by reference in its entirety.

TECHNICAL FIELD

This specification relates to the field of data processing, and in particular, to database service execution methods and apparatuses.

BACKGROUND

To protect personal data and prevent personal data leakage, usually, a user stores data in an object in a database, and performs, based on a database management system (DBMS) by referencing the object, an insert operation, a delete operation, an update operation, a select operation, etc. on the data stored in the database. The object is a constituent part of the database, and is used to store and reference the data. However, an incident that a misoperation of the user causes deletion of data that do not need to be deleted frequently occurs.

Currently, the DBMS provides a recycle bin for each user, to support the user in restoring a deleted object belonging to the user.

However, how to restore another deleted object is still an urgent problem to be resolved. Therefore, this specification provides database service execution methods.

SUMMARY

This specification provides database service execution methods and apparatuses, to partially resolve the above-mentioned problem.

This specification uses the following technical solutions. This specification provides a database service execution method, including: receiving an object deletion request, and determining a to-be-deleted object; modifying an operation permission for the to-be-deleted object, and prohibiting a user from accessing the to-be-deleted object; when an object restoration request that carries an object identifier is received, determining a to-be-deleted object corresponding to the object identifier from each to-be-deleted object whose operation permission has been modified; and modifying an operation permission for the to-be-deleted object corresponding to the object identifier, and allowing the user to access the to-be-deleted object corresponding to the object identifier.

Optionally, the receiving an object deletion request, and determining a to-be-deleted object includes: receiving the object deletion request that carries an object identifier, and determining whether an object corresponding to the object identifier is an object that needs to be directly deleted; and if yes, deleting the object: or if no, determining that the object corresponding to the object identifier is the to-be-deleted object.

Optionally, the method further includes: when the operation permission for the to-be-deleted object is modified, determining a current moment as a start moment: determining a deletion moment of the to-be-deleted object based on the start moment and a predetermined time interval; storing a correspondence between the deletion moment and the to-be-deleted object; and when the deletion moment arrives, deleting the to-be-deleted object based on the stored correspondence.

Optionally, the method further includes: when an object restoration request that carries an object identifier is received, determining a to-be-deleted object corresponding to the object identifier carried in the object restoration request; and determining, from one or more stored correspondences between deletion moments and to-be-deleted objects, a correspondence for the to-be-deleted object corresponding to the object identifier, and deleting the correspondence.

Optionally, the method further includes: when the to-be-deleted object is determined, deleting the to-be-deleted object from a namespace; when it is determined that the object identifier carried in the object restoration request corresponds to the to-be-deleted object, determining whether an object whose object identifier is the same as the object identifier carried in the object restoration request exists in the namespace; and if yes, displaying a rename prompt, to prompt the user to redetermine an object identifier of the to-be-deleted object, and in response to a rename operation of the user, redetermining the object identifier of the to-be-deleted object, and restoring the to-be-deleted object in the namespace; or if no, restoring the to-be-deleted object in the namespace.

Optionally, the method further includes: when it is determined that an available storage space in a database is less than a predetermined first threshold, determining first subobjects corresponding to the to-be-deleted object; and separately determining object types of the first subobjects, determining priorities of the first subobjects based on a predetermined object type priority, and sequentially deleting the first subobjects in descending order of the priorities of the first subobjects until the available storage space is not less than a second threshold.

Optionally, before the object restoration request that carries the object identifier is received, the method further includes: creating a corresponding object as a new object based on a received object creation request that carries the object identifier; and when an object access request that carries the object identifier is received, returning access content corresponding to the new object.

Optionally, before the object restoration request that carries the object identifier is received, the method further includes: when an object access request that carries the object identifier is received, returning an object restoration prompt, to prompt the user that the object corresponding to the object identifier has been deleted; determining, based on the received object restoration request that carries the object identifier, the to-be-deleted object corresponding to the object identifier from each to-be-deleted object whose operation permission has been modified; and modifying the operation permission for the to-be-deleted object corresponding to the object identifier, and allowing the user to access the to-be-deleted object corresponding to the object identifier.

This specification provides a database service execution apparatus, including: a deletion command receiving module, configured to receive an object deletion request, and determine a to-be-deleted object; a deletion delay module, configured to modify an operation permission for the to-be-deleted object, and prohibit a user from accessing the to-be-deleted object; a restoration command receiving module, configured to: when an object restoration request that carries an object identifier is received, determine a to-be-deleted object corresponding to the object identifier from each to-be-deleted object whose operation permission has been modified; and a restoration module, configured to modify an operation permission for the to-be-deleted object corresponding to the object identifier, and allow the user to access the to-be-deleted object corresponding to the object identifier.

This specification provides a computer-readable storage medium. The storage medium stores a computer program, and when the computer program is executed by a processor, the above-mentioned database service execution method is implemented.

This specification provides an electronic device, including a memory, a processor, and a computer program that is stored in the memory and that is capable of running on the processor. When the processor executes the program, the above-mentioned database service execution method is implemented.

In the above-mentioned at least one technical solution used in this specification, the following beneficial effects can be achieved: In the database service execution method provided in this specification, an object deletion request can be received, and a to-be-deleted object can be determined. However, the to-be-deleted object is not immediately deleted, but an operation permission for the to-be-deleted object is modified, and a user is prohibited from accessing the to-be-deleted object. When an object restoration request that carries an object identifier is received, a to-be-deleted object corresponding to the object identifier is determined from each to-be-deleted object whose operation permission has been modified; and an operation permission for the to-be-deleted object corresponding to the object identifier is modified, and the user is allowed to access the to-be-deleted object corresponding to the object identifier.

It can be learned from the above-mentioned method that, in the method, after the object deletion request is received, the object corresponding to the object deletion request is not immediately deleted, but the operation permission for the object is modified. This avoids a case in which the object is directly deleted and consequently the object cannot be restored after being directly deleted.

BRIEF DESCRIPTION OF DRAWINGS

The accompanying drawings described here are used to provide a further understanding of this specification, and constitute a part of this specification. Example embodiments of this specification and descriptions of the embodiments are used to explain this specification, and do not constitute an inappropriate limitation on this specification.

DESCRIPTION OF EMBODIMENTS

To make the objectives, technical solutions, and advantages of this specification clearer, the following clearly and comprehensively describes the technical solutions of this specification with reference to specific embodiments of this specification and corresponding accompanying drawings. Clearly, the described embodiments are merely some but not all of embodiments of this specification. Based on embodiments of this specification, all other embodiments obtained by a person of ordinary skill in the art without creative efforts fall within the protection scope of this specification.

The following describes in detail the technical solutions provided in embodiments of this specification with reference to the accompanying drawings.

Figure 1:
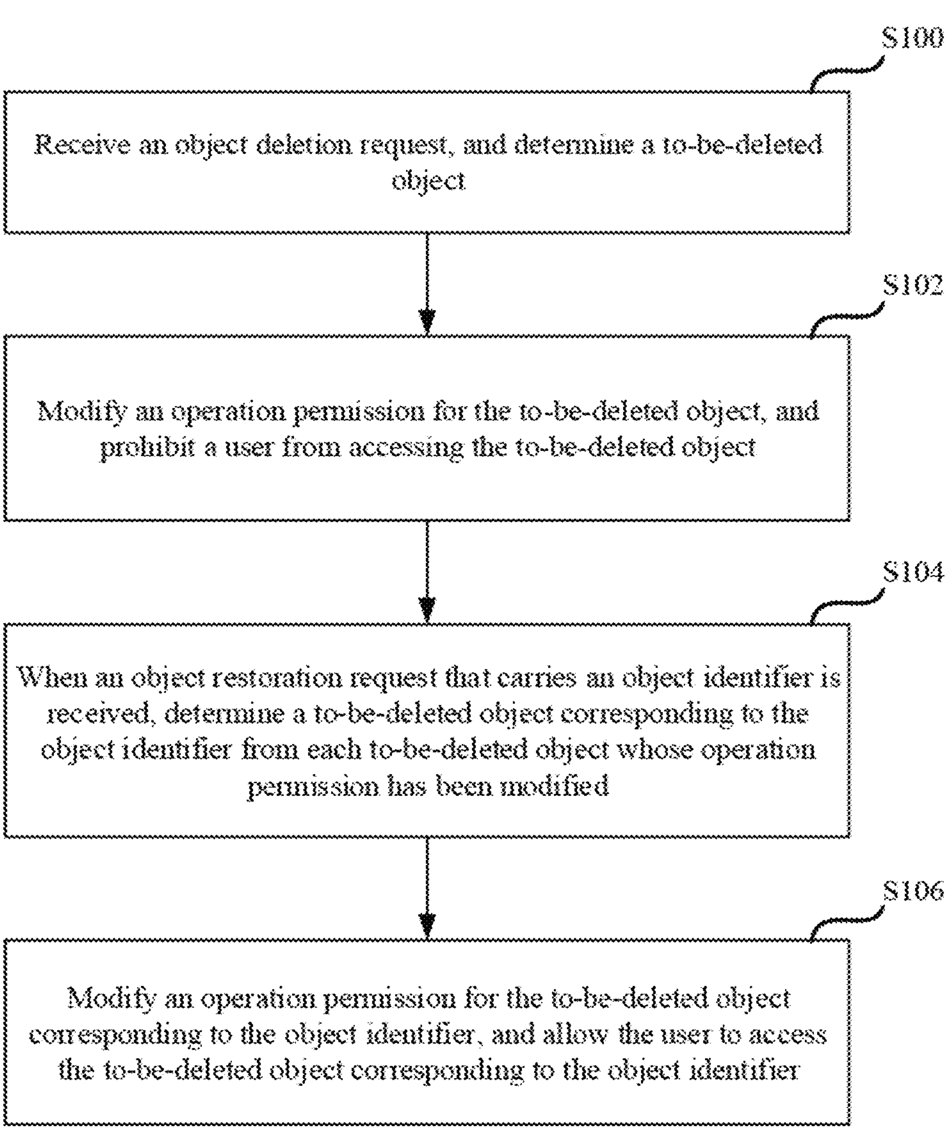
FIG. 1 is a schematic flowchart illustrating a database service execution method, according to this specification.

FIG. 1 is a schematic flowchart illustrating a database service execution method according to this specification, and includes step S100 to step S106.

S100: Receive an object deletion request, and determine a to-be-deleted object.

Generally, a user stores an object in a database, and operates the object in the database through a database management system (DBMS). To avoid a loss caused because the object stored in the database is deleted due to a misoperation of the user, this specification provides a database service execution method. In addition, generally, an object that has been thoroughly deleted cannot be restored. Therefore, in one or more embodiments of this specification, after a deletion request sent by the user is received, a corresponding object may not be immediately deleted, but meta information of the corresponding object is modified.

The object is usually stored in the database. Therefore, in one or more embodiments of this specification, the database service execution method can be performed by the database. Certainly, generally, the user operates the object in the database through the DBMS. Therefore, the database service execution method can alternatively be performed by the DBMS. In addition, the DBMS can be a system such as OceanBase or Oracle. A specific type of the DBMS is not limited in this specification, and can be set as required. For ease of description, an example in which the database performs the database service execution method is used for description in this specification.

Specifically, the database can receive the object deletion request sent by the user, determine an object identifier carried in the deletion request, and use an object corresponding to the object identifier as the to-be-deleted object.

S102: Modify an operation permission for the to-be-deleted object, and prohibit a user from accessing the to-be-deleted object.

Generally, the user can access an object because the user has an operation permission for the object, that is, the user can operate the object. Therefore, in one or more embodiments of this specification, after determining the to-be-deleted object, the database can modify the operation permission for the to-be-deleted object, so that the user cannot perform an insert operation, a delete operation, an update operation, a select operation, etc. on the object. In other words, the object that the user can access is an object on which the user has permission to perform an insert operation, a delete operation, an update operation, a select operation, etc.

Specifically, the database can modify the operation permission for the to-be-deleted object, to prohibit the user from accessing the to-be-deleted object.

In the above-mentioned method, the database can merely modify the operation permission for the to-be-deleted object, instead of immediately deleting the to-be-deleted object, thereby avoiding a case in which the to-be-deleted object cannot be restored because the to-be-deleted object is thoroughly deleted.

S104: When an object restoration request that carries an object identifier is received, determine a to-be-deleted object corresponding to the object identifier from each to-be-deleted object whose operation permission has been modified.

S106: Modify an operation permission for the to-be-deleted object corresponding to the object identifier, and allow the user to access the to-be-deleted object corresponding to the object identifier.

When the user operates the object in the database through the DBMS, a misoperation may occur, resulting in deletion of an object that does not need to be deleted. Therefore, in one or more embodiments of this specification, when the user needs to restore a to-be-deleted object, the database can determine, in response to an operation of the user, the to-be-deleted object that needs to be restored. Then, the database modifies an operation permission for the to-be-deleted object, and allows the user to access the to-be-deleted object.

Specifically, first, after receiving the object restoration request that carries the object identifier and that is input by the user, the database can determine each to-be-deleted object whose operation permission has been modified. Then, the database determines, from each to-be-deleted object whose operation permission has been modified, the to-be-deleted object whose object identifier is the same as the object identifier carried in the object restoration request.

Second, the database can modify the operation permission for the to-be-deleted object corresponding to the object identifier, so that the user is allowed to perform an insert operation, a delete operation, an update operation, a select operation, etc. on the to-be-deleted object. Certainly, after the permission for the to-be-deleted object is modified, for the user, the to-be-deleted object is not different from another object that is not deleted. Therefore, the database can determine that the to-be-deleted object is a common object rather than a to-be-deleted object.

In the above-mentioned method, the database can determine the to-be-deleted object that needs to be restored, and restore the to-be-deleted object.

Based on the database service execution method shown in FIG. 1, an object deletion request can be received, and a to-be-deleted object can be determined. However, the to-be-deleted object is not immediately deleted, but an operation permission for the to-be-deleted object is modified, and a user is prohibited from accessing the to-be-deleted object. When an object restoration request that carries an object identifier is received, a to-be-deleted object corresponding to the object identifier is determined from each to-be-deleted object whose operation permission has been modified; and an operation permission for the to-be-deleted object corresponding to the object identifier is modified, and the user is allowed to access the to-be-deleted object corresponding to the object identifier.

It can be learned from the above-mentioned method that, in the method, after the object deletion request is received, the object corresponding to the object deletion request is not immediately deleted, but the operation permission for the object is modified. This avoids a case in which the object is directly deleted and consequently the object cannot be restored after being directly deleted.

In addition, for some objects existing in the database, the user may not have operation permissions for these objects. Therefore, to distinguish the objects from the to-be-deleted object, the database can modify meta information of the to-be-deleted object.

Generally, meta information is information about an object. For example, meta information of an object table includes a creation time, a creation user, a column, an index, a constraint, etc. Therefore, in one or more embodiments of this specification, after determining the to-be-deleted object, the database can modify the meta information of the to-be-deleted object, and determine to delay deleting the to-be-deleted object.

Specifically, the database can add a deletion delay mark to the meta information of the to-be-deleted object, to determine to delay deleting the to-be-deleted object. Certainly, the database can alternatively modify another part of the meta information of the to-be-deleted object. For example, the database can determine a user identifier user1 of the user who sends the object deletion request in step S100, and add "delete user: user1" to the meta information of the to-be-deleted object. Alternatively, the database can determine that a current time is "10:42:33, Jul. 6, 2022", and add "delete time: 10:42:33, Jul. 6, 2022" to the meta information of the to-be-deleted object. Specific content of the meta information of the to-be-deleted object that is specifically modified by the database is not limited in this specification, and can be set as required. In addition, in step S102, the operation permission for the to-be-deleted object also belongs to the meta information of the to-be-deleted object.

Certainly, when determining to restore the to-be-deleted object, the database can delete the deletion delay mark in the meta information of the to-be-deleted object, and determine to restore the to-be-deleted object. In addition, the database can alternatively modify other content in the meta information. For example, a user identifier user2 of a user that restores the to-be-deleted object is determined, and "restoration user: user2" is added to the meta information of the to-be-deleted object. Alternatively, the database can add a "deleted, restored" mark to the meta information of the to-be-deleted object, to indicate that the to-be-deleted object is deleted by the user and restored by the user. Specific content of the meta information of the to-be-deleted object that is specifically modified by the database is not limited in this specification, and can be set as required.

In the above-mentioned method, the database can modify the meta information of the to-be-deleted object, to avoid a case in which the to-be-deleted object cannot be distinguished from the object in the database.

In addition, in one or more embodiments of this specification, because a space of the database is limited, when the database does not receive, within a predetermined time interval, an object restoration request that carries the object identifier of the to-be-deleted object, the to-be-deleted object can be thoroughly deleted.

Specifically, first, when modifying the operation permission for the to-be-deleted object, the database can determine a current moment as a start moment. In addition, the database determines a deletion moment of the to-be-deleted object based on the start moment and a predetermined time interval, determines a correspondence between the deletion moment and the to-be-deleted object, and stores the correspondence between the deletion moment and the to-be-deleted object.

Second, when the deletion moment arrives, the database can delete the to-be-deleted object based on the stored correspondence between the deletion moment and the to-be-deleted object.

Certainly, before the deletion moment, the to-be-deleted object may be restored by using an object restoration request input by the user. Therefore, to avoid that the database deletes the restored object, when receiving an object restoration request that carries an object identifier, the database can determine a to-be-deleted object corresponding to the object identifier carried in the object restoration request. In addition, the database determines a correspondence for the to-be-deleted object corresponding to the object identifier from one or more stored correspondences between deletion moments and to-be-deleted objects, that is, determines a correspondence between the to-be-deleted object and a deletion moment of the to-be-deleted object. Then, the database deletes the correspondence.

In the above-mentioned method, the database can delete some to-be-deleted objects, to increase an available storage space of the database. The available storage space is a space that can be used in the database, that is, the available storage space is a difference between a total storage space of the database and a storage space occupied by the object stored in the database. For example, if the total storage space of the database is 10T, and the storage space occupied by the stored data is 6T, the available storage space of the database is 4T.

In addition, in one or more embodiments of this specification, because a space of the database is limited, when the database does not receive, within a predetermined time interval, an object restoration request that carries the object identifier of the to-be-deleted object, the to-be-deleted object can be thoroughly deleted.

Specifically, first, when modifying the operation permission for the to-be-deleted object, the database can add a deletion delay mark to the meta information of the to-be-deleted object, and determine a current moment as a start moment. Then, the database determines a deletion moment of the to-be-deleted object based on the start moment and a predetermined time interval. The database determines and stores a correspondence between the deletion moment and the to-be-deleted object.

Second, when the deletion moment arrives, the database can determine the to-be-deleted object corresponding to the deletion moment based on the stored correspondence, and delete the to-be-deleted object.

Certainly, before the deletion moment, the to-be-deleted object may be restored by using an object restoration request input by the user. Therefore, to avoid that the database deletes the restored object, when receiving an object restoration request that carries an object identifier, the database can delete the deletion delay mark in the meta information of the to-be-deleted object, and determine to restore the to-be-deleted object. In addition, when the deletion moment arrives, the database can determine, based on the stored correspondence between the deletion moment and the to-be-deleted object, whether the meta information of the to-be-deleted object includes the deletion delay mark. If yes, the to-be-deleted object is deleted. If no, the to-be-deleted object is not deleted.

In the above-mentioned method, the database can delete some to-be-deleted objects, to increase an available storage space of the database. The available storage space is a space that can be used in the database, that is, the available storage space is a difference between a total storage space of the database and a storage space occupied by data stored in the database.

In addition, in one or more embodiments of this specification, because the space of the database is limited, when the available storage space of the database is less than a predetermined first threshold, the to-be-deleted object can be thoroughly deleted. The available storage space is a space that can be used in the database.

Specifically, when determining that the available storage space is less than the predetermined first threshold, the database can randomly delete one or more to-be-deleted objects until the available storage space of the database is not less than a predetermined second threshold. Certainly, the database can alternatively determine start moments of all to-be-deleted objects, and sequentially delete the to-be-deleted objects in a sequence of the start moments of the to-be-deleted objects until the available storage space of the database is not less than the second threshold.

It is worthwhile to note that the second threshold can be equal to the first threshold, or can be greater than the first threshold. It can be understood that when the second threshold is equal to the first threshold, a quantity of to-be-deleted objects that are deleted is the smallest, so that a case in which when the user needs to restore a to-be-deleted object, the to-be-deleted object has been deleted due to an insufficient available storage space of the database is avoided to the greatest extent. When the second threshold is greater than the first threshold, a quantity of times of deleting a to-be-deleted object due to an insufficient space can be reduced, thereby improving database running efficiency. For example, after the database determines that the available storage space 5T is less than the first threshold 10T, some to-be-deleted objects are deleted, and the available storage space is restored to 10T, which is not less than the second threshold 10T. The user adds some objects to the database, and a storage space of 1T is occupied in total. The available storage space changes to 9T, and some to-be-deleted objects need to be deleted. In other words, when the user does not thoroughly delete an object in the database, each time some objects are added to the database, the database needs to delete some to-be-deleted objects, resulting in low efficiency. A specific value of each of the first threshold and the second threshold can be set as required, and is not limited in this specification.

In the above-mentioned method, the database can delete some to-be-deleted objects, to increase an available storage space of the database.

In addition, in one or more embodiments of this specification, when determining that the available storage space is less than the predetermined first threshold, and deleting the to-be-deleted object, the database can determine first subobjects corresponding to the to-be-deleted object, and determine object types of the first subobjects. Then, priorities of the first subobjects are separately determined based on a predetermined object type priority and the object types of the first subobjects. The first subobjects are sequentially deleted in descending order of the priorities of the first subobjects. For example, the first subobjects of the to-be-deleted object are index A, unique index B, column C, and foreign key D, and a priority of the index is 3, a priority of the unique index is 2, a priority of the column is 1, and a priority of the foreign key is 4. Therefore, the database can delete the first subobjects in a sequence of foreign key D, index A, unique index B, and column C. Deletion of the first subobjects is stopped when the available storage space of the database is not less than a predetermined second threshold. The second threshold is greater than or equal to the first threshold.

In addition, some data stored in the database need to be stored secretly, for example, an account and a password of a consumer, and real-name authentication information of the consumer. When the user needs to delete an object corresponding to such data, to avoid leakage, in one or more embodiments of this specification, the database can directly delete the object corresponding to such data.

Specifically, the database can preferentially determine, in response to an operation of the user, that one or more object types are a first specified object type. When the user needs to delete an object, the database can determine an object deletion request input by the user. In addition, the database determines an object identifier from the object deletion request, and then determines, based on the object identifier, an object type of an object corresponding to the object identifier. The database determines whether the object type is the first specified object type, that is, whether the object is an object that needs to be directly deleted. If yes, the object is deleted. If no, it is determined that the object corresponding to the object identifier is a to-be-deleted object, and a subsequent step continues to be performed. The first specified object type can include a foreign key, an index, etc.

In the above-mentioned method, the database determines, based on the object type of the object corresponding to the object identifier in the object deletion request input by the user, whether to immediately delete the object.

In addition, in one or more embodiments of this specification, for some objects, the user may want to immediately delete these objects. Therefore, the database can determine, based on a deletion instruction input by the user, whether a to-be-deleted object needs to be restored.

Specifically, the database can determine, in response to an operation of the user, an object deletion request input by the user. In addition, the database determines a to-be-deleted object from the object deletion request. Then, the database determines, based on a deletion instruction carried in the object deletion request, whether the to-be-deleted object needs to be restored. If yes, the to-be-deleted object is determined, and a subsequent step continues to be performed. If no, the to-be-deleted object is deleted.

In the above-mentioned method, the database can determine, based on the deletion instruction input by the user, whether to immediately delete the to-be-deleted object.

In addition, in one or more embodiments of this specification, because some to-be-deleted objects correspond to one or more first subobjects, the database can determine, based on object types of the first subobjects, whether to delay deleting the first subobjects.

Specifically, first, the database can determine, in response to an operation of the user, that one or more object types are a second specified object type. The second specified object type can include a foreign key, an index, etc.

Second, the database can determine whether the to-be-deleted object corresponds to one or more first subobjects. If yes, for each first subobject, the database can determine, based on an object type of the first subobject, whether the object type is the second specified object type. When determining that a determining result is yes, the database can delete the first subobject. When determining that a determining result is no, the database adds a “deletion delay” mark to meta information of the first subobject, to determine to delay deleting the first subobject. If no, the database can continue to perform a subsequent step.

However, because some first subobjects do not need to be deleted, the database can determine, in response to an operation of the user, that one or more object types are a third specified object type. Then, after determining that the first subobject does not belong to the second specified object type, the database can determine whether an object type of the first subobject is the third specified object type. If yes, the first subobject is retained. If no, the first subobject is deleted. The third specified object type can include a unique index, a column, etc. In addition, in one or more embodiments of this specification, some to-be-deleted objects marked with a deletion delay may be deleted due to an insufficient available storage space of the database, etc. For example, the to-be-deleted object is table E, and table E corresponds to four first subobjects: column F, unique index G, index H, and foreign key I. If column F is deleted because the available storage space of the database is insufficient, when the user restores table E, only unique index G, index H, and foreign key I exist in table E. Generally, a table without a column is meaningless. Table E restored by the user is meaningless.

To avoid such a case, the database can retain one or more first subobjects. Still referring to the above-mentioned example, the database can retain column F, and if the available storage space of the database is insufficient, the database can delete index G. When the user restores table E, index H and foreign key I can be restored, and index H, foreign key I, and retained column F for table E.

In the above-mentioned method, the database can determine, based on the object types of the first subobjects corresponding to the to-be-deleted object, how to process the first subobjects.

In addition, in one or more embodiments of this specification, in step S100, after the user inputs a deletion instruction, regardless of whether a to-be-deleted object corresponding to an object identifier in the deletion instruction is deleted or meta information of the to-be-deleted object is modified, the to-be-deleted object does not exist from a perspective of the user. In addition, generally, in the same namespace, a name of an object cannot be repeated. Therefore, to avoid that the to-be-deleted object affects naming of an object by the user, the database can delete the to-be-deleted object from the namespace. In addition, when the user restores the to-be-deleted object, the database can determine whether an object whose object identifier is the same as the object identifier of the to-be-deleted object exists.

Specifically, when determining the to-be-deleted object, the database can determine a namespace of the to-be-deleted object, and delete the to-be-deleted object from the namespace.

Second, when receiving an object restoration request that carries an object identifier corresponding to the to-be-deleted object, the database can determine whether an object whose object identifier is the same as the object identifier carried in the object restoration request exists in the namespace. If yes, the database can display a rename prompt for the to-be-deleted object, to prompt the user to redetermine an object identifier of the to-be-deleted object. In addition, the database can redetermine the object identifier of the to-be-deleted object in response to a rename operation of the user, and restore the to-be-deleted object in the namespace. If no, the to-be-deleted object can be directly restored in the namespace. Certainly, it is worthwhile to note that only the object identifier of the object is deleted from the namespace, and data of the object are not deleted. Therefore, as long as the object identifier of the to-be-deleted object is subsequently restored in the namespace, access permission of the user for the to-be-deleted object can be restored. As such, the user can perform an insert operation, a delete operation, an update operation, or a select operation on the to-be-deleted object.

In addition, because there is a first subobject corresponding to a second subobject, in one or more embodiments of this specification, after modifying the meta information of the first subobject, the database can determine whether the first subobject corresponds to a second subobject.

Specifically, for each first subobject, after modifying meta information of the first subobject, the database can determine whether the first subobject corresponds to one or more second subobjects. If yes, for each second subobject, the database determines an object type of the second subobject, and determines, based on the object type, whether the second subobject belongs to the second specified object type. When determining that a determining result is yes, the database can delete the second subobject. When determining that a determining result is no, the database adds a "deletion delay" mark to meta information of the second subobject, to determine to delay deleting the second subobject. If no, the database can continue to perform a subsequent step.

However, because some second subobjects do not need to be deleted, after determining that the second subobject does not belong to the second specified object type, the database can determine whether an object type of the second subobject is the third specified object type. If yes, the second subobject is retained. If no, the second subobject is deleted.

In the above-mentioned method, the database can determine, based on types of second subobjects, whether to delay deleting the second subobjects.

In addition, in one or more embodiments of this specification, because the storage space of the database is limited, the user can thoroughly delete a to-be-deleted object.

Specifically, the database can receive a thorough-deletion instruction that carries an object identifier of a to-be-deleted object, determine a to-be-deleted object whose object identifier is the same as the object identifier carried in the deletion instruction and whose operation permission has been modified, and thoroughly delete the to-be-deleted object.

Certainly, there may be a plurality of to-be-deleted objects whose object identifiers are the same as the object identifier carried in the deletion instruction. Therefore, the database can determine whether there is only one to-be-deleted object whose object identifier is the same as the object identifier carried in the deletion instruction and whose operation permission has been modified. If yes, the database can delete the to-be-deleted object. If no, the database can return a selection prompt to prompt the user to select at least one to-be-deleted object from one or more to-be-deleted objects, and delete, in response to a selection operation of the user, the at least one to-be-deleted object selected by the user.

In addition, for some objects existing in the database, the user may modify operation permissions for these objects. Therefore, to avoid erroneous object deletion, in one or more embodiments of this specification, after receiving the deletion instruction, the database can delete a to-be-deleted object whose object identifier is the same as the object identifier carried in the deletion instruction and whose meta information carries a deletion delay mark. If there are a plurality of to-be-deleted objects whose object identifiers are the same as the object identifier carried in the deletion instruction and whose meta information carries the deletion delay mark, the database can return a selection prompt to prompt the user to select at least one to-be-deleted object from one or more determined to-be-deleted objects. In addition, in response to a selection operation of the user, the database deletes the at least one to-be-deleted object selected by the user.

In addition, in one or more embodiments of this specification, to restore the to-be-deleted object, in step S102, when modifying the operation permission for the to-be-deleted object, the database can retain a restoration permission of the user for the to-be-deleted object. In addition, to thoroughly delete the to-be-deleted object when the available storage space of the database is insufficient, in step S102, when modifying the operation permission for the to-be-deleted object, the database can retain a deletion permission of the user for the to-be-deleted object.

In addition, in one or more embodiments of this specification, before the to-be-deleted object is restored, the user cannot access the to-be-deleted object. In this case, when the database receives an access request of the user for the to-be-deleted object, to improve access efficiency, the database can return an object restoration prompt to indicate that a to-be-deleted object corresponding to the access request of the user has been deleted.

Specifically, when receiving an object access request that carries the object identifier, if determining that an object with the object identifier has been deleted, the database can return an object restoration prompt, to prompt the user that the to-be-deleted object corresponding to the access request has been deleted, and the user can restore the to-be-deleted object and access the to-be-deleted object.

When receiving an object restoration request that carries the object identifier and that is sent by the user, the database can determine, based on the object identifier, a to-be-deleted object corresponding to the object identifier from each to-be-deleted object whose operation permission has been modified.

Then, the database modifies an operation permission for the to-be-deleted object corresponding to the object identifier, allows the user to access the to-be-deleted object corresponding to the object identifier, and restores the to-be-deleted object. Certainly, when receiving an object access request that carries the object identifier again, the database can return access content corresponding to the to-be-deleted object.

In the above-mentioned method, when the to-be-deleted object corresponding to the access request sent by the user is deleted, the database can prompt the user to restore the to-be-deleted object, thereby improving running efficiency of the database.

In addition, generally, some users may not be authorized to delete or restore an object. Therefore, in one or more embodiments of this specification, the database can verify a permission of the user.

Specifically, in step S100, after receiving the object deletion request, the database can verify whether the user that sends the object deletion request has a deletion permission for the object corresponding to the object identifier carried in the object deletion request. If yes, the to-be-deleted object is determined. If no, a no-permission operation prompt is returned, to indicate that the user does not have permission to delete the object. In step S104, after receiving the object restoration request that carries the object identifier, the database can verify whether the user that sends the object restoration request has a restoration permission for the to-be-deleted object. If yes, the to-be-deleted object corresponding to the object identifier is determined. If no, a no-permission operation prompt is returned, to indicate that the user does not have permission to restore the to-be-deleted object.

In addition, when receiving another request or instruction sent by the user, for example, an access request or an object modification request, the database can also verify whether the user that sends the request or the instruction has a corresponding permission, and determine whether to perform an operation corresponding to the request or the instruction. Certainly, there are relatively mature technologies for determining whether the user has operation permissions for some objects in the database. Details are omitted in this specification for simplicity.

In the above-mentioned method, the database can determine, by verifying whether the user has a deletion permission, a restoration permission, etc. for an object, whether to perform an operation corresponding to a request or an instruction sent by the user, thereby avoiding a case in which a user without a corresponding permission operates an object.

It is worthwhile to note that all actions of obtaining a signal, information, or data in this specification are performed in compliance with corresponding data protection regulations and policies of the local country, and are authorized by owners of corresponding apparatuses.

The database service execution method provided in one or more embodiments of this specification is described above. Based on the same idea, this specification further provides a corresponding database service execution apparatus, as shown in FIG. 2.

Figure 2:
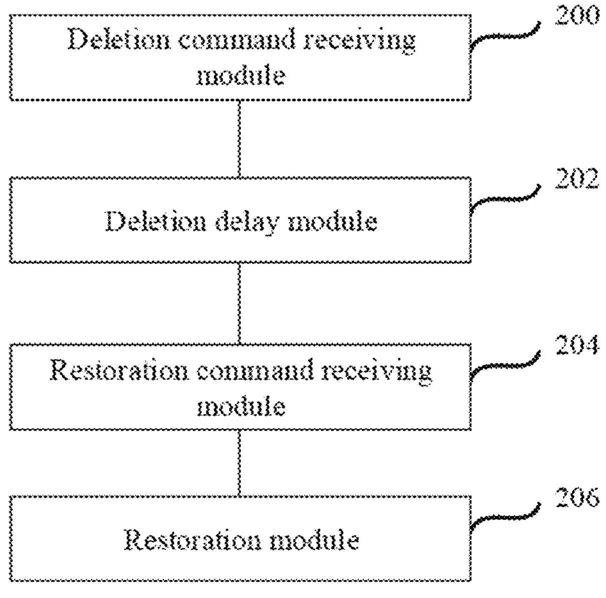
FIG. 2 is a schematic diagram illustrating a database service execution apparatus, according to this specification.

FIG. 2 is a schematic diagram illustrating a database service execution apparatus according to this specification. The apparatus includes: a deletion command receiving module 200, configured to receive an object deletion request, and determine a to-be-deleted object: a deletion delay module 202, configured to modify an operation permission for the to-be-deleted object, and prohibit a user from accessing the to-be-deleted object; a restoration command receiving module 204, configured to: when an object restoration request that carries an object identifier is received, determine a to-be-deleted object corresponding to the object identifier from each to-be-deleted object whose operation permission has been modified; and a restoration module 206, configured to modify an operation permission for the to-be-deleted object corresponding to the object identifier, and allow the user to access the to-be-deleted object corresponding to the object identifier.

Optionally, the deletion command receiving module 200 is configured to receive the object deletion request that carries an object identifier, and determine whether an object corresponding to the object identifier is an object that needs to be directly deleted; and if yes, delete the object; or if no, determine that the object corresponding to the object identifier is the to-be-deleted object.

Optionally, the deletion delay module 202 is configured to: when the operation permission for the to-be-deleted object is modified, determine a current moment as a start moment; determine a deletion moment of the to-be-deleted object based on the start moment and a predetermined time interval; store a correspondence between the deletion moment and the to-be-deleted object; and when the deletion moment arrives, delete the to-be-deleted object based on the stored correspondence.

Optionally, the deletion delay module 202 is configured to: when an object restoration request that carries an object identifier is received, determine a to-be-deleted object corresponding to the object identifier carried in the object restoration request; and determine, from one or more stored correspondences between deletion moments and to-be-deleted objects, a correspondence for the to-be-deleted object corresponding to the object identifier, and delete the correspondence.

Optionally, the deletion command receiving module 200 is configured to: when the to-be-deleted object is determined, delete the to-be-deleted object from a namespace; when it is determined that the object identifier carried in the object restoration request corresponds to the to-be-deleted object, determine whether an object whose object identifier is the same as the object identifier carried in the object restoration request exists in the namespace; and if yes, display a rename prompt, to prompt the user to redetermine an object identifier of the to-be-deleted object, and in response to a rename operation of the user, redetermine the object identifier of the to-be-deleted object, and restore the to-be-deleted object in the namespace; or if no, restore the to-be-deleted object in the namespace.

Optionally, the deletion delay module 202 is configured to: when it is determined that an available storage space in a database is less than a predetermined first threshold, determine first subobjects corresponding to the to-be-deleted object; and separately determine object types of the first subobjects, determine priorities of the first subobjects based on a predetermined object type priority, and sequentially delete the first subobjects in descending order of the priorities of the first subobjects until the available storage space is not less than a second threshold.

Optionally, the deletion delay module 202 is configured to create a corresponding object as a new object based on a received object creation request that carries the object identifier; and when an object access request that carries the object identifier is received, return access content corresponding to the new object.

Optionally, before the object restoration request that carries the object identifier is received, the deletion delay module 202 is configured to: when an object access request that carries the object identifier is received, return an object restoration prompt, to prompt the user that the object corresponding to the object identifier has been deleted; determine, based on the received object restoration request that carries the object identifier, the to-be-deleted object corresponding to the object identifier from each to-be-deleted object whose operation permission has been modified; and modify the operation permission for the to-be-deleted object corresponding to the object identifier, and allow the user to access the to-be-deleted object corresponding to the object identifier.

This specification further provides a computer-readable storage medium. The storage medium stores a computer program, and the computer program can be used to perform the database service execution method provided in FIG. 1.

Figure 3:
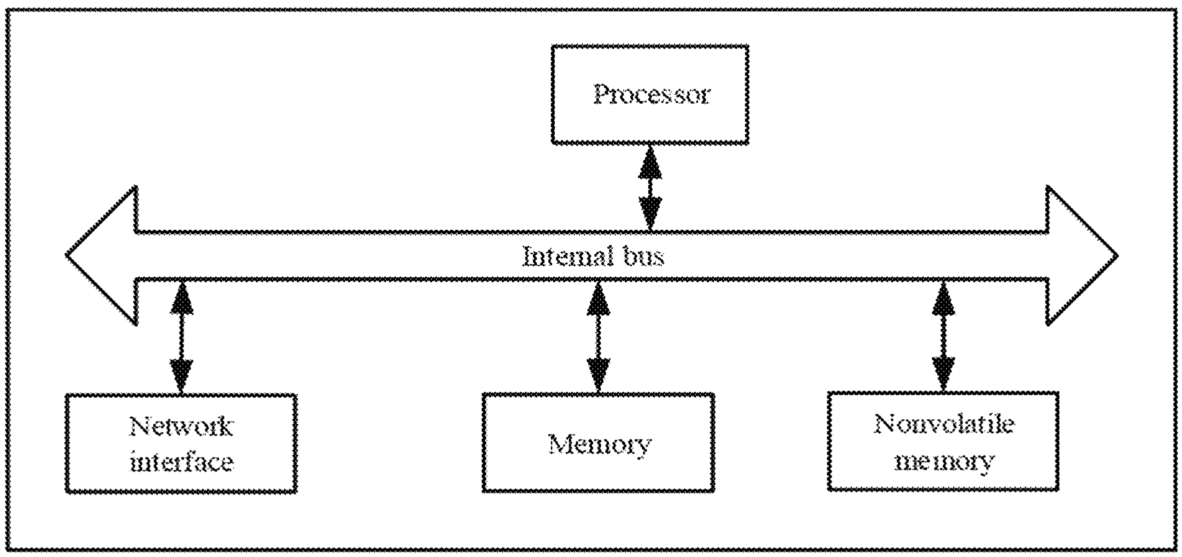
FIG. 3 is a schematic diagram illustrating an electronic device corresponding to FIG. 1, according to this specification.

This specification further provides a schematic structural diagram illustrating an electronic device shown in FIG. 3. As shown in FIG. 3, in terms of hardware, the electronic device includes a processor, an internal bus, a network interface, a memory, and a nonvolatile memory, and certainly may further include hardware needed by another service. The processor reads a corresponding computer program from the nonvolatile memory into the memory and then runs the computer program, to implement the database service execution method in FIG. 1. Certainly, in addition to a software implementation, this specification does not rule out another implementation, for example, a logic device or a combination of software and hardware. To be specific, an execution body of the following processing procedure is not limited to each logical unit, and can be hardware or a logic device.

In the 1990s, whether improvement to a technology is hardware improvement (for example, improvement to a circuit structure like a diode, a transistor, or a switch) or software improvement (improvement to a method procedure) can be clearly identified. However, with development of technologies, improvement to many existing method procedures can be considered as direct improvement to hardware circuit structures. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and manufacture an application-specific integrated circuit chip. In addition, at present, instead of manually manufacturing an integrated circuit chip, such programming is mostly implemented by using "logic compiler" software, which is similar to a software compiler used to develop and write a program. Original code needs to be written in a particular programming language for compilation. The language is referred to as a hardware description language (HDL). There are many types of HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. It should also be clear to a person skilled in the art that a hardware circuit that implements a logical method procedure can be readily obtained once the method procedure is logically programmed by using one or more above-mentioned hardware description languages and is programmed into an integrated circuit.

A controller can be implemented in any suitable way. For example, the controller can be in a form such as a microprocessor, a processor, or a computer-readable medium, a logic gate, a switch, an application-specific integrated circuit (ASIC), a programmable logic controller, or an embedded microcontroller storing computer-readable program code (such as software or firmware) that can be executed by the (micro) processor. Examples of the controller include but are not limited to the following microcontrollers: ARC 625D. Atmel AT91SAM, Microchip PIC18F26K20, and Silicone Labs C8051F320. A memory controller can also be implemented as a part of control logic of the memory. A person skilled in the art also knows that, in addition to implementing the controller by using only computer-readable program code, logic programming can be performed on a method step, so that the controller implements the same function in a form of a logic gate, a switch, an application-specific integrated circuit, a programmable logic controller, an embedded microcontroller, etc. Therefore, the controller can be considered as a hardware component, and an apparatus included in the controller and configured to implement various functions can also be considered as a structure in the hardware component. Or the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an e-mail device, a game console, a tablet computer, a wearable device, or any combination of these devices.

For ease of description, the above-mentioned apparatus is separately described by dividing the apparatus into various units based on functions. Certainly, during implementation of this specification, functions of units can be implemented in the same or more software and/or hardware.

A person skilled in the art should understand that embodiments of this specification can be provided as a method, a system, or a computer program product. Therefore, this specification can use a form of hardware only embodiments, software only embodiments, or embodiments with a combination of software and hardware. In addition, a form of a computer program product that is implemented on one or more computer-usable storage media (including but not limited to a disk memory, a CD-ROM, an optical memory, etc.) that include computer-usable program code can be used in this specification.

This specification is described with reference to the flowcharts and/or block diagrams of the method, the device (system), and the computer program product based on embodiments of this specification. It should be understood that each procedure and/or block in the flowcharts and/or the block diagrams and a combination of procedures and/or blocks in the flowcharts and/or the block diagrams can be implemented by using computer program instructions. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more procedures in the flowcharts and/or in one or more blocks in the block diagrams.

Alternatively, these computer program instructions can be stored in a computer-readable storage that can instruct a computer or another programmable data processing device to work in a specific manner, so the instructions stored in the computer-readable storage generate an artifact that includes an instruction apparatus. The instruction apparatus implements a specific function in one or more procedures in the flowcharts and/or in one or more blocks in the block diagrams.

Alternatively, these computer program instructions can be loaded onto a computer or another programmable data processing device, so that a series of access steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPU), an input/output interface, a network interface, and a memory.

The memory may include a form of a non-permanent memory, a random access memory (RAM), a nonvolatile memory, etc. in a computer-readable medium, such as a read-only memory (ROM) or a flash memory (flash RAM). The memory is an example of the computer-readable medium.

Computer-readable media, including permanent and non-permanent, removable and non-removable media, can be implemented by any method or technology for information storage. The information can be computer-readable instructions, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It should be further noted that the terms "include", "comprise", or any other variants thereof are intended to cover a non-exclusive inclusion, so that a process, a method, a product, or a device that includes a list of elements not only includes those elements but also includes other elements which are not expressly listed, or further includes elements inherent to such s process, method, product, or device. Without more constraints, an element preceded by "includes a . . . " does not preclude the presence of additional identical elements in the process, method, product, or device that includes the element.

A person skilled in the art should understand that embodiments of this specification can be provided as methods, systems, or computer program products. Therefore, a form of hardware only embodiments, software only embodiments, or embodiments with a combination of software and hardware can be used in this specification. Furthermore, this specification can use a form of a computer program product implemented on one or more computer-usable storage media (including but not limited to a disk memory, a CD-ROM, an optical memory, etc.) that include computer-usable program code.

This specification can be described in the general context of computer-executable instructions executed by a computer, for example, a program module. Generally, the program module includes a routine, a program, an object, a component, a data structure, etc. for executing a specific task or implementing a specific abstract data type. This specification can alternatively be practiced in distributed computing environments. In the distributed computing environments, tasks are executed by remote processing devices connected through a communication network. In a distributed computing environment, the program module can be located in both local and remote computer storage media including storage devices.

Embodiments of this specification are described in a progressive way. For same or similar parts in the embodiments, refer to each other. Each embodiment focuses on a difference from other embodiments. Particularly, the system embodiment is basically similar to the method embodiment, and therefore is briefly described. For a related part, refer to some descriptions in the method embodiment.

The above-mentioned descriptions are embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A database service execution method, comprising:

receiving an object deletion request, and determining a to-be-deleted object;

modifying an operation permission for the to-be-deleted object, and prohibiting a user from accessing the to-be-deleted object;

when an object restoration request that carries an object identifier is received, determining a to-be-deleted object corresponding to the object identifier from each to-be-deleted object whose operation permission has been modified; and modifying an operation permission for the to-be-deleted object corresponding to the object identifier, and allowing the user to access the to-be-deleted object corresponding to the object identifier when the to-be-deleted object is determined, deleting the to-be-deleted object from a namespace;

when it is determined that the object identifier carried in the object restoration request corresponds to the to-be-deleted object, determining whether an object whose object identifier is the same as the object identifier carried in the object restoration request exists in the namespace; and upon determining that an object whose object identifier is the same as the object identifier carried in the object restoration request exists in the namespace, displaying a rename prompt, to prompt the user to redetermine an object identifier of the to-be-deleted object, and in response to a rename operation of the user, redetermining the object identifier of the to-be-deleted object, and restoring the to-be-deleted object in the namespace.

2. The method according to claim 1, wherein receiving the object deletion request, and determining the to-be-deleted object comprises:

receiving the object deletion request that carries an object identifier, and determining whether an object corresponding to the object identifier is an object that needs to be directly deleted; and upon determining that an object corresponding to the object identifier is an object that needs to be directly deleted, deleting the object; or upon determining that an object corresponding to the object identifier is not an object that needs to be directly deleted, determining that the object corresponding to the object identifier is the to-be-deleted object.

3. The method according to claim 1, wherein the method further comprises:

when the operation permission for the to-be-deleted object is modified, determining a current moment as a start moment;

determining a deletion moment of the to-be-deleted object based on the start moment and a predetermined time interval;

storing a correspondence between the deletion moment and the to-be-deleted object; and when the deletion moment arrives, deleting the to-be-deleted object based on the stored correspondence.

4. The method according to claim 3, wherein the method further comprises:

when an object restoration request that carries an object identifier is received, determining a to-be-deleted object corresponding to the object identifier carried in the object restoration request; and determining, from one or more stored correspondences between deletion moments and to-be-deleted objects, a correspondence for the to-be-deleted object corresponding to the object identifier, and deleting the correspondence.

5. The method according to claim 1, wherein the method further comprises:

upon determining that an object whose object identifier is the same as the object identifier carried in the object restoration request does not exist in the namespace, restoring the to-be-deleted object in the namespace.

6. The method according to claim 1, wherein the method further comprises:

when it is determined that an available storage space in a database is less than a predetermined first threshold, determining first subobjects corresponding to the to-be-deleted object; and separately determining object types of the first subobjects, determining priorities of the first subobjects based on a predetermined object type priority, and sequentially deleting the first subobjects in descending order of the priorities of the first subobjects until the available storage space is not less than a second threshold.

7. The method according to claim 1, wherein before the object restoration request that carries the object identifier is received, the method further comprises:

creating a corresponding object as a new object based on a received object creation request that carries the object identifier; and when an object access request that carries the object identifier is received, returning access content corresponding to the new object.

8. The method according to claim 1, wherein before the object restoration request that carries the object identifier is received, the method further comprises:

when an object access request that carries the object identifier is received, returning an object restoration prompt, to prompt the user that the object corresponding to the object identifier has been deleted;

determining, based on the received object restoration request that carries the object identifier, the to-be-deleted object corresponding to the object identifier from each to-be-deleted object whose operation permission has been modified; and modifying the operation permission for the to-be-deleted object corresponding to the object identifier, and allowing the user to access the to-be-deleted object corresponding to the object identifier.

9. A non-transitory computer-readable storage medium, wherein the storage medium stores a computer program, and when the computer program is executed by a processor, the processor is caused to:

receive an object deletion request, and determine a to-be-deleted object;

modify an operation permission for the to-be-deleted object, and prohibit a user from accessing the to-be-deleted object;

when an object restoration request that carries an object identifier is received, determine a to-be-deleted object corresponding to the object identifier from each to-be-deleted object whose operation permission has been modified; and modify an operation permission for the to-be-deleted object corresponding to the object identifier, and allow the user to access the to-be-deleted object corresponding to the object identifier when the to-be-deleted object is determined, delete the to-be-deleted object from a namespace;

when it is determined that the object identifier carried in the object restoration request corresponds to the to-be-deleted object, determine whether an object whose object identifier is the same as the object identifier carried in the object restoration request exists in the namespace; and upon determining that an object whose object identifier is the same as the object identifier carried in the object restoration request exists in the namespace, display a rename prompt, to prompt the user to redetermine an object identifier of the to-be-deleted object, and in response to a rename operation of the user, redetermine the object identifier of the to-be-deleted object, and restore the to-be-deleted object in the namespace.

10. The non-transitory computer-readable storage medium according to claim 9, wherein the processor being caused to receive the object deletion request, and determine the to-be-deleted object includes being caused to:

receive the object deletion request that carries an object identifier, and determine whether an object corresponding to the object identifier is an object that needs to be directly deleted; and upon determining that an object corresponding to the object identifier is an object that needs to be directly deleted, delete the object; or upon determining that an object corresponding to the object identifier is not an object that needs to be directly deleted, determine that the object corresponding to the object identifier is the to-be-deleted object.

11. The non-transitory computer-readable storage medium according to claim 9, wherein the processor is further caused to:

when the operation permission for the to-be-deleted object is modified, determine a current moment as a start moment;

determine a deletion moment of the to-be-deleted object based on the start moment and a predetermined time interval;

store a correspondence between the deletion moment and the to-be-deleted object; and when the deletion moment arrives, delete the to-be-deleted object based on the stored correspondence.

12. The non-transitory computer-readable storage medium according to claim 11, wherein the processor is further caused to:

when an object restoration request that carries an object identifier is received, determine a to-be-deleted object corresponding to the object identifier carried in the object restoration request; and determine, from one or more stored correspondences between deletion moments and to-be-deleted objects, a correspondence for the to-be-deleted object corresponding to the object identifier, and delete the correspondence.

13. An electronic device, comprising a memory, a processor, and a computer program that is stored in the memory and that is capable of running on the processor, wherein when the processor executes the program, the electronic device is caused to:

receive an object deletion request, and determine a to-be-deleted object;

modify an operation permission for the to-be-deleted object, and prohibit a user from accessing the to-be-deleted object;

when an object restoration request that carries an object identifier is received, determine a to-be-deleted object corresponding to the object identifier from each to-be-deleted object whose operation permission has been modified; and modify an operation permission for the to-be-deleted object corresponding to the object identifier, and allow the user to access the to-be-deleted object corresponding to the object identifier when the to-be-deleted object is determined, delete the to-be-deleted object from a namespace;

when it is determined that the object identifier carried in the object restoration request corresponds to the to-be-deleted object, determine whether an object whose object identifier is the same as the object identifier carried in the object restoration request exists in the namespace; and upon determining that an object whose object identifier is the same as the object identifier carried in the object restoration request exists in the namespace, display a rename prompt, to prompt the user to redetermine an object identifier of the to-be-deleted object, and in response to a rename operation of the user, redetermine the object identifier of the to-be-deleted object, and restore the to-be-deleted object in the namespace.

14. The electronic device according to claim 13, wherein the electronic device being caused to receive the object deletion request, and determine the to-be-deleted object includes being caused to:

receive the object deletion request that carries an object identifier, and determine whether an object corresponding to the object identifier is an object that needs to be directly deleted; and upon determining that an object corresponding to the object identifier is an object that needs to be directly deleted, delete the object; or upon determining that an object corresponding to the object identifier is not an object that needs to be directly deleted, determine that the object corresponding to the object identifier is the to-be-deleted object.

15. The electronic device according to claim 13, wherein the electronic device is further caused to:

when the operation permission for the to-be-deleted object is modified, determine a current moment as a start moment;

determine a deletion moment of the to-be-deleted object based on the start moment and a predetermined time interval;

store a correspondence between the deletion moment and the to-be-deleted object; and when the deletion moment arrives, delete the to-be-deleted object based on the stored correspondence.

16. The electronic device according to claim 15, wherein the electronic device is further caused to:

when an object restoration request that carries an object identifier is received, determine a to-be-deleted object corresponding to the object identifier carried in the object restoration request; and determine, from one or more stored correspondences between deletion moments and to-be-deleted objects, a correspondence for the to-be-deleted object corresponding to the object identifier, and delete the correspondence.

17. The electronic device according to claim 13, wherein the electronic device is further caused to:

upon determining that an object whose object identifier is the same as the object identifier carried in the object restoration request does not exist in the namespace, restore the to-be-deleted object in the namespace.

18. The electronic device according to claim 13, wherein the electronic device is further caused to:

when it is determined that an available storage space in a database is less than a predetermined first threshold, determine first subobjects corresponding to the to-be-deleted object; and separately determine object types of the first subobjects, determine priorities of the first subobjects based on a predetermined object type priority, and sequentially delete the first subobjects in descending order of the priorities of the first subobjects until the available storage space is not less than a second threshold.

19. The electronic device according to claim 13, wherein before the object restoration request that carries the object identifier is received, the electronic device is further caused to:

create a corresponding object as a new object based on a received object creation request that carries the object identifier; and when an object access request that carries the object identifier is received, return access content corresponding to the new object.

20. The electronic device according to claim 13, wherein before the object restoration request that carries the object identifier is received, the electronic device is further caused to:

when an object access request that carries the object identifier is received, return an object restoration prompt, to prompt the user that the object corresponding to the object identifier has been deleted;

determine, based on the received object restoration request that carries the object identifier, the to-be-deleted object corresponding to the object identifier from each to-be-deleted object whose operation permission has been modified; and modify the operation permission for the to-be-deleted object corresponding to the object identifier, and allow the user to access the to-be-deleted object corresponding to the object identifier.

* * * * *